United States Patent
Ellam et al.

(10) Patent No.: US 11,392,712 B2
(45) Date of Patent: Jul. 19, 2022

(54) CONTROLLING ACCESS TO A RESOURCE BASED ON THE OPERATING ENVIRONMENT

(71) Applicant: Hewlett-Packard Development Company, L.P., Spring, TX (US)

(72) Inventors: Daniel Ellam, Bristol (GB); Gurchetan Grewal, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 157 days.

(21) Appl. No.: 16/485,805

(22) PCT Filed: Apr. 27, 2017

(86) PCT No.: PCT/US2017/029901
§ 371 (c)(1),
(2) Date: Aug. 14, 2019

(87) PCT Pub. No.: WO2018/199962
PCT Pub. Date: Nov. 1, 2018

(65) Prior Publication Data
US 2020/0050784 A1    Feb. 13, 2020

(51) Int. Cl.
*G06F 21/62*    (2013.01)
*G06F 21/57*    (2013.01)
*G06F 21/60*    (2013.01)
*H04L 9/40*    (2022.01)

(52) U.S. Cl.
CPC ........ *G06F 21/6218* (2013.01); *G06F 21/577* (2013.01); *G06F 21/602* (2013.01); *G06F 21/604* (2013.01); *H04L 63/20* (2013.01); *G06F 2221/2111* (2013.01)

(58) Field of Classification Search
CPC .. G06F 21/6218; G06F 21/577; G06F 21/602; G06F 21/604; G06F 2221/2111; G06F 21/62; H04L 63/20
See application file for complete search history.

(56) References Cited

U.S. PATENT DOCUMENTS

| | | | |
|---|---|---|---|
| 8,925,037 B2 | 12/2014 | Marino et al. | |
| 9,369,495 B2 | 6/2016 | Gillon et al. | |
| 9,519,814 B2 | 12/2016 | Cudzilo | |
| 9,596,568 B1 | 3/2017 | Keller | |
| 2008/0271150 A1* | 10/2008 | Boerger | G06F 21/32 726/25 |

(Continued)

FOREIGN PATENT DOCUMENTS

CN    103605597    2/2014

OTHER PUBLICATIONS

Mietten, M et al., ConXsense—Automated Context Classification for Context-Aware Access Contro, Jun. 5, 2014,< https://arxiv.org/pdf/1308.2903.pdf ><.

*Primary Examiner* — Meng Li
(74) *Attorney, Agent, or Firm* — HP Inc. Patent Department (57) ABSTRACT

In an example, a method includes determining an operating environment of a device based on sensor data from a sensor of the device that senses surroundings of the device. Access to a resource may be controlled based on the operating environment and a status of a security feature of the device.

16 Claims, 4 Drawing Sheets

(56) References Cited

U.S. PATENT DOCUMENTS

| | | | |
|---|---|---|---|
| 2013/0326578 A1* | 12/2013 | Blom | H04L 63/20 |
| | | | 726/1 |
| 2014/0189784 A1* | 7/2014 | Marino | G06F 21/60 |
| | | | 726/1 |
| 2015/0154492 A1* | 6/2015 | Ponomarev | G09B 5/04 |
| | | | 706/11 |
| 2015/0350254 A1 | 12/2015 | Hendrick et al. | |
| 2015/0372997 A1 | 12/2015 | Lokamathe et al. | |
| 2016/0248809 A1 | 8/2016 | Smith et al. | |
| 2016/0300048 A1* | 10/2016 | Mason | G06F 21/31 |

\* cited by examiner

CONTROLLING ACCESS TO A RESOURCE BASED ON THE OPERATING ENVIRONMENT

BACKGROUND

A company may allow workers to operate in a mobile fashion, such as allowing workers to use computing devices to access sensitive information from various locations. Depending on the location, the information may be at risk of being revealed to unauthorized persons.

BRIEF DESCRIPTION OF DRAWINGS

Examples will now be described, by way of non-limiting example, with reference to the accompanying drawings, in which.

DETAILED DESCRIPTION

A user of a device that works for a particular organization may wish to use the device for work purposes (such as for example accessing sensitive data) in a variety of locations. These locations may vary in the level of security of the environment and the opportunity for unauthorized persons to view or access data or a resource on the device.

The risk of an unauthorized person accessing information or a resource from a device being used by a user depends on the environment in which the device is being used. In some examples, the device may interpret data from at least one sensor to determine or classify the environment in which the device is being used. In some examples, the device may interpret data from at least one sensor to determine or classify a security level or risk level associated with the environment that reflects the ease with which an unauthorized person may access information on the device in the absence of security, privacy and/or data protection controls.

For example, if the user is using the computing device in an office in which the user works, the environment may be assumed to be low risk or high security, whereas other locations may be regarded as high risk or low security. For instance, if the user is using the computing device in a busy coffee shop, then the environment may be a high risk or low security environment. In such an environment, the device may be connected to an unencrypted public wireless network, and/or persons behind the device other than the user may be able to view the device's screen and any information that may be displayed thereon. Classification of the environment and/or the level of security or data loss risk associated therewith may be based on data from one or more sensors. For example, if the processing device includes a Global Positioning System (GPS) module that reports the computing device's location in a coffee shop, the processing device may use input from other sensors, such as a camera or microphone, to determine other characteristics of the environment. For example, the processing device may determine the number or the approximate number of people in the environment based on noise level from a microphone, number of distinct voices in data from a microphone, and number of people detected in pictures or video from a camera, to determine the number or approximate number of people in the environment or whether the coffee shop is "busy" or "quiet." The processing device may determine that a quiet coffee shop is a relatively secure environment compared to a busy coffee shop, for instance.

In some examples, the processing device may use information from the sensors, a determination of the type of the environment, and/or a classification of the security or risk level of the environment to take action to protect the device from access to data or functionality by unauthorized persons. For example, access to the device, the data or the functionality may be restricted unless one or more security or data protection measures are operational. In some examples, the device may cause the security or data protection measures to become operational, after which access may be allowed.

Figure 1:
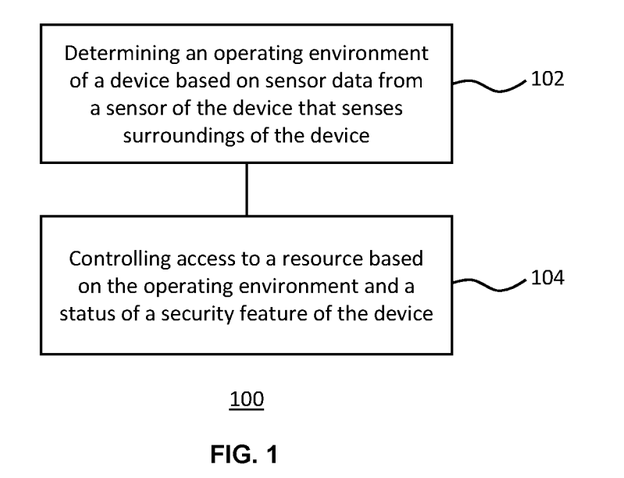
FIG. 1 is a flowchart of an example of a method of data protection.

FIG. 1 shows an example of a method 100, which may be for example a method of data protection, and which may be a computer implemented method. The method includes, at block 102, determining an operating environment of a device based on sensor data from a sensor of the device that senses surroundings of the device. The sensor may be for example a camera, microphone, location sensor, accelerometer and network communications device. The sensor may sense surroundings of the device. For example, a microphone may sense audio around the device. A camera may take pictures or video. A location sensor may provide a location of the device. An accelerometer may provide information relating to movement of the device. A network communications device may provide information that can be used to determine a nearby network environment, such as for example the number of nearby devices, network utilization, internet protocol (IP) address and/or identification of nearby networks.

The sensor supplies sensor data that may be interpreted to determine an operating environment of the device. In some examples, the operating environment may indicate the type of environment, such as the type of premises. For example, the operating environment may indicate that the device is at the office, in the user's home, at a coffee shop, a hotel, a client's office, a public transport terminal or an airport. The operating environment may provide more information regarding the environment than a location, as a location my not indicate for example the type of premises at which the device is being used. In some examples, sensor data from multiple sensors may be combined to provide a classification of the environment. In some examples, information from a sensor is classified, and classifications from multiple sensors may be combined to provide an environment classification.

In some examples, the operating environment may indicate the movement status of the device, such as whether the device is moving, the speed and/or direction using data from an accelerometer and/or location sensor. This may be used to determine that the device is being used on public transport such as a train or plane. In some examples, information from multiple sensors may be used to infer an operating environment of the device. For example, if the device is moving quickly as indicated by data from an accelerometer, and the device is near a railway line as indicated by location data from a location sensor, then it is likely that the device is travelling on a train.

In some examples, the operating environment may indicate how busy the operating environment is. For example, audio data from a microphone may be used to determine a level of ambient noise and/or a number of distinct voices, and/or video and/or pictures from a camera may be used to recognize distinct people or faces in the camera's field of view.

In some examples, data from one or more sensors may be insufficient to be able to classify or reliably classify the operating environment in which the device is being used. The user of the device may for example then be prompted to describe or classify the operating environment, for example by inputting information into the device.

The method 100 also includes, in block 104, controlling access to a resource based on the operating environment and a status of a security feature of the device. In some examples, a resource may comprise, for example, data stored on or potentially accessible by the device. In some examples, the resource may comprise a particular network such as an office network. In some examples the resource may comprise functionality of the device such as an input/output interface (e.g. a USB port, HDMI port, near field communication interface, WiFi or other communications interfaces, etc).

In some examples, the security feature may be a feature of the device with a purpose relating to maintaining security of the device and/or protecting data stored on or potentially accessible by the device (such as for example stored on an office network). Examples of security features include software security features such as anti-virus software, data encryption software, firewalls, automatic software updates, BIOS and/or operating system boot protection and settings of software usable on the device. Other examples of security features include hardware security features such as privacy screen that restricts the viewing angle of the device's screen, and availability of input/output interfaces. The status of the security feature may for example indicate the level of security or protection currently provided by the security feature. For example, the status of anti-virus software may indicate whether the software is installed, whether the software is enabled or disabled, and/or whether associated anti-virus definitions are up to date. For example, the status of a privacy screen may indicate whether the privacy screen is enabled or disabled. In some examples, the status may be an operational status of the security feature, such as for example its level of functionality, whether it is enabled or disabled, whether it is functioning correctly, and/or its status regarding whether it is up to date.

The operating environment and the status of the security feature are used to control access to the resource. For example, if the operating environment indicates a lower level of security or a higher risk of data loss to unauthorized persons, then access to the resource may be controlled such that access is denied if the status of the security feature indicates a lower level of security or data protection on the device.

For example, the operating environment may indicate a busy coffee shop, with several people other than the device's user in the camera's field of view, which may indicate that the people may be able to view the device's screen. Access to the resource may be controlled such that access is denied if security features such as a privacy screen are disabled, and access is allowed if the security features are enabled and/or up to date. In another example, the camera and/or microphone may indicate that the environment is busy, but other sensor data may indicate that the environment is generally secure, such as the device being located at the office or connected to an office network. This may indicate that the people in the environment are co-workers of the user of the device. The constraints for device security may then be relaxed, such that for example fewer or no security features may be enabled or up to date before access to the resource is granted.

In another example, the user may be in a coffee shop, and data from a microphone and/or camera may indicate that the environment is not busy. The constraints for the security feature may be more relaxed than for a busy coffee shop. For example, enablement of a privacy screen may not be a prerequisite for allowing access to the resource, and/or disabled or out of date anti-virus software may not lead to denial of access to the resource.

In another example, the user may be travelling on public transportation such as a train or plane. Access may be denied to the resource unless the status of the security feature indicates a high level of security, such as for example a privacy screen being enabled.

In another example, the user may be attempting to access the resource in a location away from the office, such as at home or in a public place. For example, the device may be connected to a non-trusted or public network. Device security obligations may therefore be higher than if the device is connected to for example an office network. For example, access to the resource may be denied unless anti-virus software is up to date, a firewall is enabled, and/or USB port access is disabled.

In some examples, whether to allow or deny access to the resource may be based on a security policy. The security policy may specify whether to allow or deny access for each of a number of operating environments. For example, the security policy may specify that access should be allowed if the device is connected to an office network, access should be allowed if the device is connected to a public network and a firewall is enabled and/or anti-virus software is up to date, and access should be denied if the device is connected to a public network and a firewall is disabled and/or anti-virus software is out of date.

In some examples, a security feature may be selected to mitigate a specific type of possible security threat. For example, data from a camera may suggest that one or more unauthorized persons may be able to view the device's screen. Therefore, access may be denied if a privacy screen is disabled. For example, data from a network communications device and/or location sensor may suggest that the device is connected to an unsecured public network. Therefore, access may be denied if a firewall is disabled and/or anti-virus software is disabled or out of date.

In some examples, a method of data protection may be carried out on a repeating or ongoing basis. For example, the method 100 of FIG. 100 may be repeated periodically and/or in response to an event such as a change in the operating environment of the device. For instance, a user may be using the device within a relatively secure environment, but then may take the device to a less secure environment such as a busy train. A repeated iteration of the method 100 may determine the new operating environment and control access to the resource accordingly, for example to ensure continued data protection and/or security.

Figure 2:
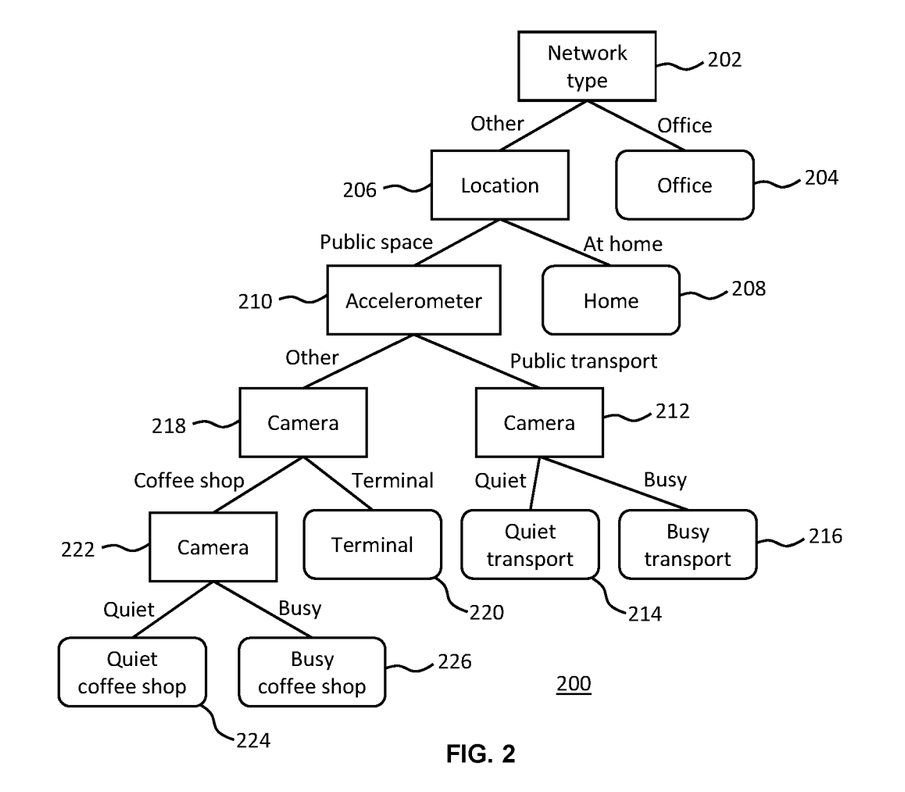
FIG. 2 is an example of a tree structure to determine an operating environment.

FIG. 2 shows an example of a tree structure 200 that may in some examples be used to determine an operating environment from sensor data. The tree structure 200 may be an example of an operating environment classification policy. At top level node 202 the tree structure directs that a type of network to which the device is connected is considered. If the device is connected to an office network then at node 204 the tree structure determines that the operating environment is an office. If the device is connected to another type of network, such as a home or public network, then at node 206 the tree structure may direct that the location of the device (as indicated by for example data from a GPS sensor) is considered. If the device location indicates the user's home, then at node 208 the tree structure 200 indicates that the operating environment is "at home." If however the location indicates a public space, then at node 210 the tree structure 200 indicates that accelerometer data is considered. If accelerometer data indicates that the device is moving quickly, then the user of the device may be travelling on public transport. Therefore, at node 212, the tree structure directs that camera data is considered. If camera data indicates that the environment is quiet (such as for example showing a small number of people or faces) then at node 214 the tree structure determines that the operating environment is quiet public transport, otherwise if the environment is busy (such as for example a large number of people being shown in data from the camera) then at node 216 the operating environment is determined to be busy public transport.

The tree structure indicates that if at node 210 accelerometer data does not indicate travel on public transport, then at node 218 camera data is considered to determine whether the device is in a public transport terminal or a coffee shop. Camera data such as still pictures or video may be interpreted to determine the type of premises in which the device is located. For example, images from the camera may be analyzed and the analysis may indicate that the device is in a public transport terminal. As such, at node 220 the tree structure indicates that the operating environment is a public transport terminal. Otherwise, at node 218 the tree structure 200 may indicate that the device is in a coffee shop. Therefore, at node 222, the tree structure directs camera data to be considered to determine if the environment is busy or quiet. If the camera data indicates that the environment is quiet, then at node 224 the tree structure 200 indicates that the device is in a quiet coffee shop, otherwise the camera data may indicate that the environment is busy, in which case at node 226 the tree structure 200 indicates that the device is in a busy coffee shop.

In some examples, the security policy may indicate, for one or more of the possible operating environments, the device security obligations to be met before access is allowed.

In some examples, the device may indicate to the user that access to a resource has been enabled or disabled. In some examples, the status of the security feature may be controlled based on the operating environment. For example, if the operating environment is determined to be less secure, then the security feature may be automatically enabled and/or updated.

In some examples, the device may allow access to the resource once the user has manually modified the status of the security feature. For example, the user may manually enable a privacy screen, or manually update anti-virus software, before access is allowed. In some examples, the device may present the user with a prompt such as an on-screen message to modify the status of the security feature.

Figure 3:
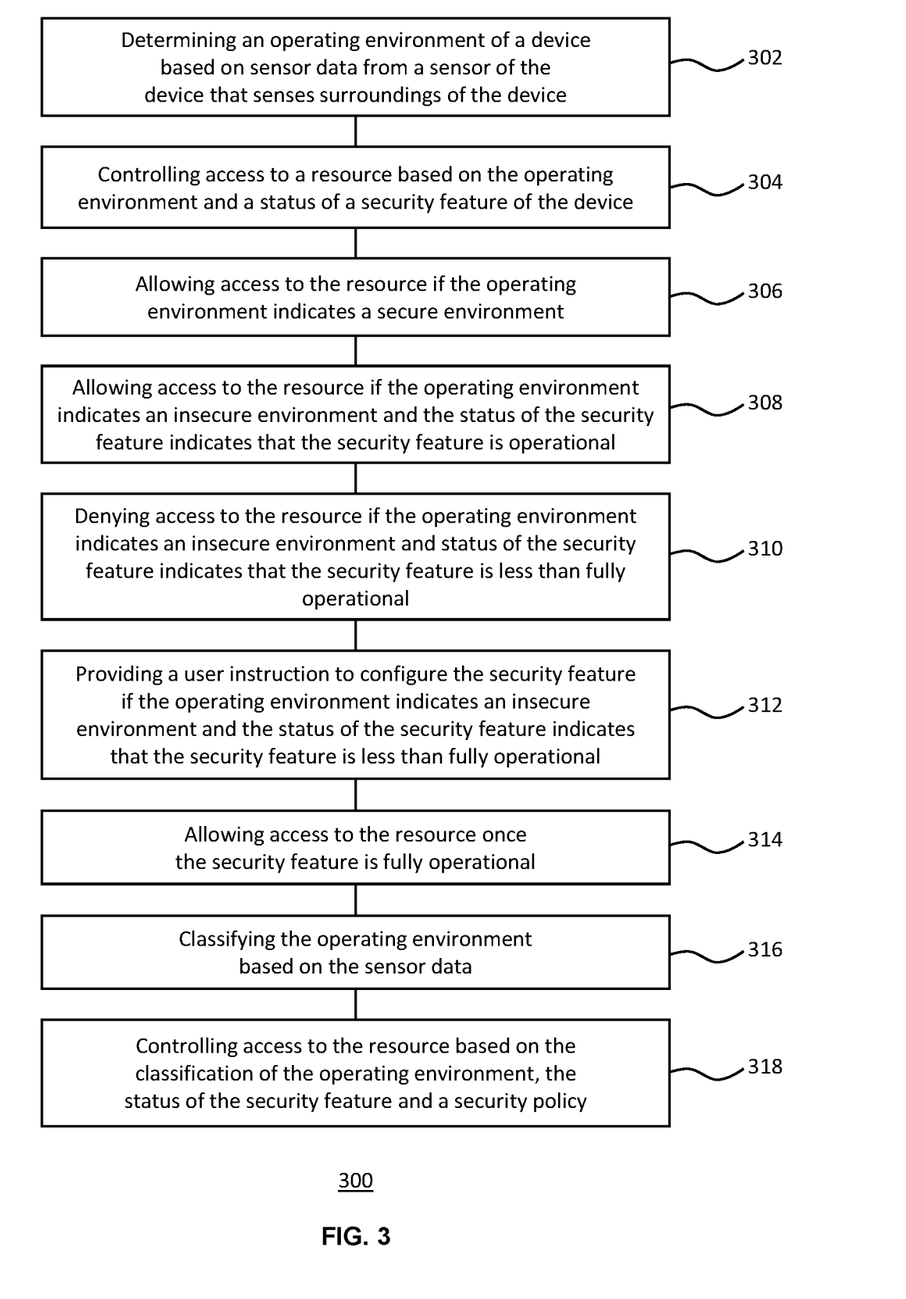
FIG. 3 is a flowchart of another example of a method of data protection.

FIG. 3 shows an example of a method 300, which may be for example a method of data protection, and which may be a computer implemented method. The method includes, at block 302, determining an operating environment of a device based on sensor data from a sensor of the device that senses surroundings of the device, similar to block 102 of the method 100 shown in FIG. 1. The method 300 also includes, in block 304, controlling access to a resource based on the operating environment and a status of a security feature of the device, similar to block 104 of the method 100 shown in FIG. 1.

The method 300 also includes, in block 306, allowing access to the resource if the operating environment indicates a secure environment. For example, if the operating environment is an office at which the device user works, the method 300 may determine that this is a secure environment with a low risk of data loss to unauthorized persons, access to the resource may be allowed without checking if security features are enabled or up to date.

The method 300 includes, in block 308, allowing access to the resource if the operating environment indicates an insecure environment and the status of the security feature indicates that the security feature is operational. The insecure environment may be, for example, an environment with a relatively high risk of data loss such as located within a busy coffee shop or connected to a public wireless network. If the security feature is operational, such as for example the security feature being enabled or up to date, then the security feature may reduce the risk of data loss or other security breaches within the operating environment, and access to the resource is therefore allowed.

In block 310, the method 300 comprises denying access to the resource if the operating environment indicates an insecure environment and status of the security feature indicates that the security feature is less than fully operational. Therefore, in some examples, access is denied where there is a risk of data loss or security breach in the device and the security feature is not fully operational, such as disabled or out of date.

The method includes, in block 312, receiving a user instruction to configure the security feature if the operating environment indicates an insecure environment and the status of the security feature indicates that the security feature is less than fully operational. In some examples, the user may then configure the security feature by enabling or updating the security feature. In block 314, access to the resource is then allowed once the security feature is fully operational.

In block 316 of the method 300, the operating environment is classified based on sensor data. The classification of the operating environment may indicate in some examples a type of premises, whether the operating environment is secure or insecure and/or a security level for the operating environment. Classification may in some examples be performed using a tree structure such as the tree structure 200 shown in FIG. 2. In block 318, the method 300 includes controlling access to the resource based on the classification of the operating environment, the status of the security feature and a security policy. The security policy may for example indicate, for each classification of the operating environment, whether to allow or deny access to one or more resources based on the status of one or more security features of the device. In some examples, the device may classify the environment from sensor data. The device may then determine whether the environment is secure or insecure, or determine a security level, data loss risk level or security or data loss risk classification, using the classification of the environment by consulting the security policy.

Figure 4:
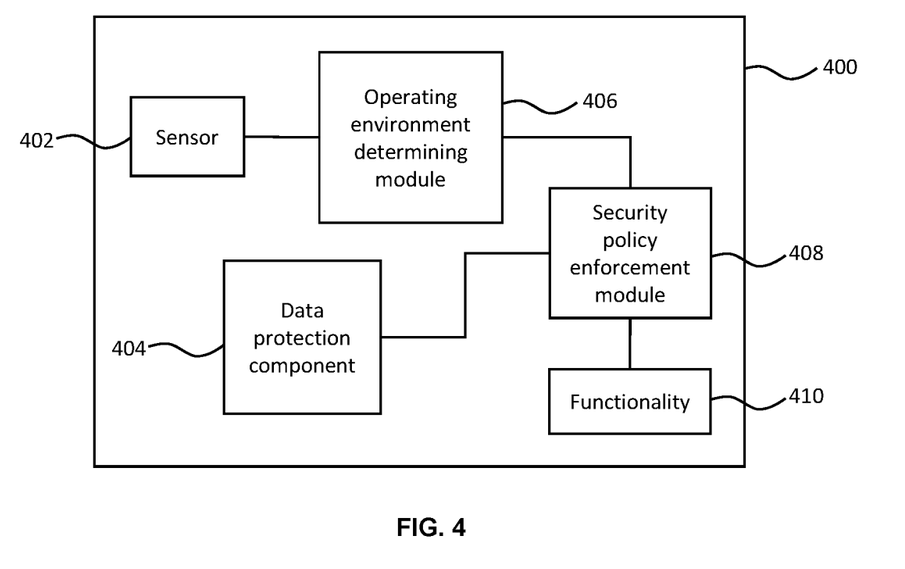
FIG. 4 a simplified schematic of an example of a device.

FIG. 4 shows an example of a device 400 including a sensor 402 to sense an environment in which the device 400 operates. The device 400 also includes a data protection component 404. The data protection component may reduce the risk of data loss to unauthorized parties. For example, the data protection component may be a hardware component, such as a privacy screen, or a software component, such as anti-virus software or a firewall.

The device 400 also includes an operating environment determining module 406. This module 406 determines an indication of an environment in which the device operates based on data from the sensor 402. The indication of the environment may, in some examples, indicate a secure or insecure environment, an environment type such as an office or a busy coffee shop, or a level of security risk or risk of data loss to unauthorized parties.

The device 400 includes a security policy enforcement module 408 to control access to functionality 410 by the device 400 based on the indication of the environment and based on a status of the data protection component 404. In some examples, if the indication of the environment indicates a secure environment, access to the functionality 410 may be granted regardless of the status of the data protection component. In some examples, if the indication of the environment indicates a less secure or insecure environment, access may be granted to the functionality 410 by the enforcement module 408 if the status of the data protection component is at an acceptable level. This level may be, for example, enabled, up to date and/or operational. The functionality 410 may be, in some examples, a feature of the device such as USB ports, or may comprise the ability of the device 400 to access data and/or software stored on the device 400 or in a remote network such as an office network.

Figure 5:
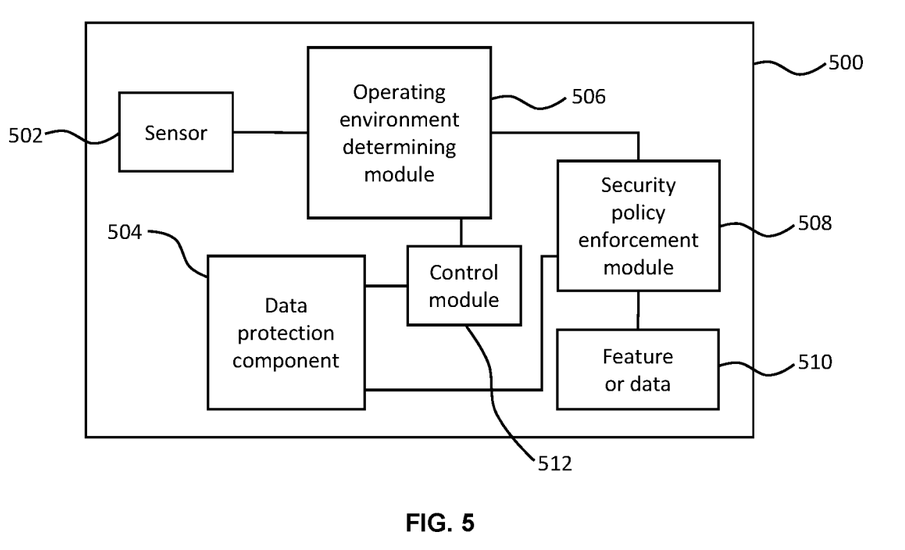
FIG. 5 a simplified schematic of another example of a device.

FIG. 5 shows an example of a device 500. The device 500 includes a sensor 502, a data protection component 504, an operating environment determining module 506 and a security policy enforcement module 508, which are similar to the components 402-408 shown in FIG. 4. The security policy enforcement module 508 controls access to feature or data 510, which may in some examples be functionality of the device 500 or usable by the device 500.

The device 500 also comprises a control module 512 to control the status of the data protection component 502 based on the indication. The control module 512 may therefore receive the indication from the determining module 506.

Figure 6:
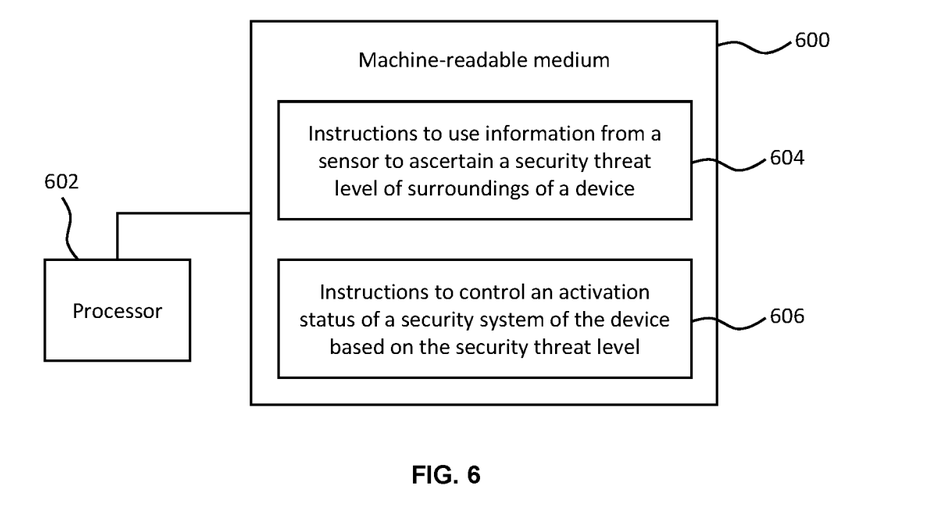
FIG. 6 is an example of a machine-readable medium including instructions in association with a processor.

FIG. 6 shows a machine-readable medium 600 in association with a processor 602. The machine readable medium 600 includes instructions 604 that, when executed by the processor 602, cause the processor to use information from a sensor to ascertain a security threat level of surroundings of a device. In some examples, the security threat level may indicate the type of surroundings (such as for example the premises type at which the device is being used), the device security level and/or the level of data loss risk to unauthorized persons.

The machine readable medium 600 also includes instructions 606 that, when executed by the processor 602, cause the processor to control an activation status of a security system of the device based on the security threat level. The control of the activation status may in some examples be automatic. For example, if the security threat level is relatively high, or indicates an insecure or less secure environment than for example an office, then protection measures such as a privacy screen, a firewall and/or anti-virus software may be automatically enabled or updated by the device. In some examples, control of the activation status may be user-prompted. For example, the device may prompt the user to activate the security system (e.g. enable the privacy screen or update anti-virus software). In some examples, the device may then take further action, such as accessing a resource, data or feature, though the device may wait until the user has activated the security feature before doing so.

Figure 7:
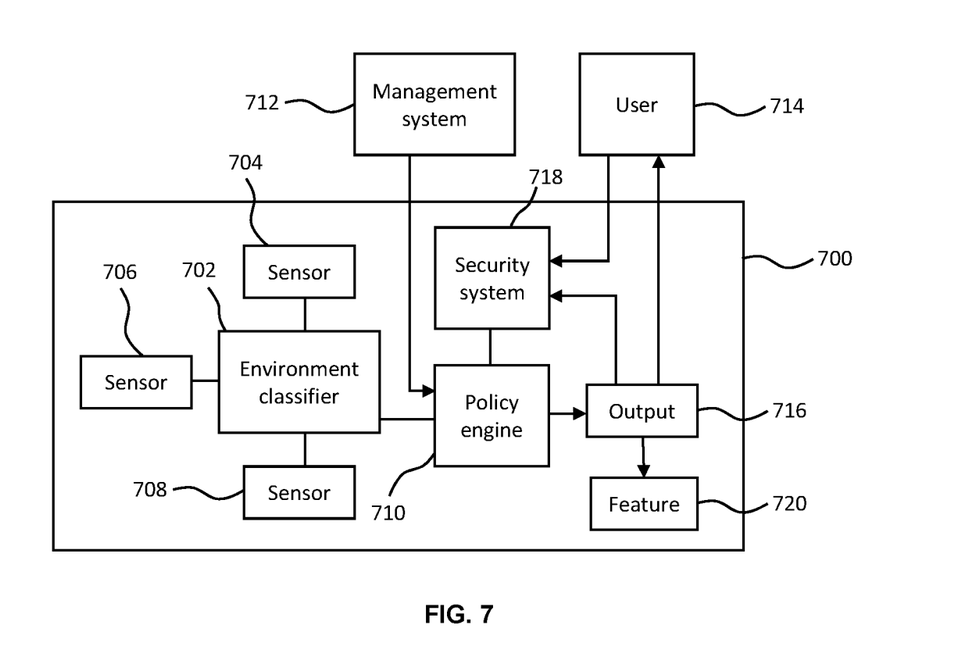
FIG. 7 a simplified schematic of a further example of a device.

FIG. 7 shows an example of a device 700. The device 700 includes an environment classifier 702 that classifies the type of environment and/or classifies a level of security, security risk and/or data loss risk associated with the environment surrounding the device 700. The environment classifier 702 receives information from sensors and provides an environment classification in response thereto. The example device 700 includes three sensors 704, 706 and 708.

The environment classifier 702 provides the environment classification, which may indicate the type of environment and/or classifies a level of security, security risk and/or data loss risk associated with the environment surrounding the device 700, to a policy engine 710. The policy engine 710 implements a security policy specified by a management system 712 that may, for example, be associated with an organization at which a user 714 of the device 700 works.

The policy engine 710 provides an output 716. The output 716 is based on the environment classification and the security policy. In some examples, the policy engine is based on the status of a security system 718, such as for example a privacy screen, firewall and/or anti-virus software. The output 716 may therefore control access to a feature 720 of the device 700. The feature 720 may comprise, for example, hardware, software and/or information included in the device 700 or accessible by the device 700. The policy engine 710 may, for example, provide the output 716 to allow access to the feature 720 if the status of the security system 718 is acceptable in the operating environment according to the security policy from the management system 712. The security policy may in some examples indicate that access to the feature 720 is not allowed in one or more particular environments, regardless of the status of the security system 718.

In some examples, the output 716 is provided to the security system 718 to control the status of the security system 718. For example, the security policy from the management system 712 may indicate that access to the feature 720 is allowed in the operating environment specified by the environment classifier 702 if the status of the security system 718 has a first status, and denied if the security system 718 has a second status. The device policy engine 710 may provide an output 716 to the security system 718 to control its status to the first status (such as, for example, operational, activated and/or up to date) such that access to the feature 720 can be allowed.

In some examples, the output 716 is provided to the user 714, for example in the form of a prompt or message suggesting that the user control the security system 718 such that its status is the first status. Access to the feature 720 may then be allowed. In some examples the output 716 may comprise a message to the user that access to the feature 720 is not allowed in the operating environment indicated by the environment classifier 702.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
 determining an operating environment of a device based on sensor data from two or more sensors of the device that sense surroundings of the device, wherein determining the operating environment uses a tree structure including nodes to indicate characteristics of the operating environment from the sensor data, wherein at a top first level node, the tree structure is to determine the type of network to which the device is connected, and at a subsequent lower second level node, the tree structure is to determine a location of the device;
 determining a status of a security feature of the device, the status of the security feature indicating whether the security feature is enabled and functioning correctly; and
 controlling access to a resource based, at least in part, on the operating environment and the status of the security feature of the device.

2. The method of claim 1, wherein controlling access comprises:
 allowing access to the resource if the operating environment indicates a secure environment; and
 allowing access to the resource if the operating environment indicates an insecure environment and the status of the security feature indicates that the security feature is operational.

3. The method of claim 1, wherein controlling access comprises:
 denying access to the resource if the operating environment indicates an insecure environment and the status of the security feature indicates that the security feature is less than fully operational.

4. The method of claim 1, wherein controlling access comprises:
 receiving a user instruction to configure the security feature if the operating environment indicates an insecure environment and the status of the security feature indicates that the security feature is less than fully operational; and
 allowing access to the resource once the security feature is fully operational.

5. The method of claim 1, wherein controlling access to the resource comprises controlling access to the resource based on a security policy.

6. The method of claim 1, wherein the two or more sensors comprise at least one of a camera, microphone, location sensor, accelerometer and network communications device.

7. The method of claim 1, wherein determining the operating environment further comprises classifying the operating environment based on the sensor data, and
 wherein controlling access to the resource is further based on the classification of the operating environment, the status of the security feature and a security policy.

8. The method of claim 7, wherein the security policy indicates instructions for controlling access to the resource based on the status of the security feature for each classification of the operating environment.

9. The method of claim 1, wherein the status of the security feature indicating whether the security feature is up to date.

10. The method of claim 1 wherein when the location of the device indicates a public space, then at a third level node, the tree structure determines that accelerometer data is considered, followed by camera data, when the accelerometer data indicates that the device is moving quickly.

11. A device comprising:
 two or more sensors to sense an environment in which the device operates;
 a data protection component;
 one or more processors; and one or more non-transitory computer-readable media with logic encoded thereon, the one or more processors executing the logic to perform operations comprising:

determining, by an operating environment determining module, an indication of an environment in which the device operates based on data from the sensor, wherein determining the operating environment uses a tree structure including nodes of sensor data indicating characteristics of the operating environment from the sensor data, wherein at a top first level node, the tree structure is to determine the type of network to which the device is connected, and at a subsequent lower second level node, the tree structure is to determine a location of the device;

determining, by a security policy enforcement module, a status of the data protection component, the status of the data protection component indicating whether the data protection component is enabled and functioning correctly; and controlling, by the security policy enforcement module, access to functionality by the device based, at least in part, on the indication of the environment and based on the status of the data protection component.

12. The device of claim 11, wherein the operations further comprise controlling, by a control module, the status of the data protection component based on the indication.

13. The device of claim 11, wherein the functionality comprises one of a feature of the device or access to data.

14. The device of claim 11, wherein controlling access to the functionality by the security policy enforcement module is further based on a security policy.

15. The device of claim 11, wherein determining the indication by the operating environment determining module is to indicate a level of data loss risk in the environment.

16. A machine-readable medium comprising instructions that, when executed by a processor, cause the processor to:

use information from two or more sensors to ascertain a security threat level of surroundings of a device by using a tree structure including nodes of the information to indicate characteristics of the surroundings;

wherein at a top first level node, the tree structure is to determine the type of network to which the device is connected, and at a subsequent lower second level node, the tree structure is to determine a location of the device; and control an activation status of a security system of the device based on the security threat level.

* * * * *